United States Patent [19]

Jensen

[11] 4,017,841

[45] Apr. 12, 1977

[54] BUS ALLOCATION CONTROL APPARATUS

[75] Inventor: Earl D. Jensen, Bloomington, Minn.

[73] Assignee: Honeywell Inc., Minneapolis, Minn.

[22] Filed: July 21, 1975

[21] Appl. No.: 597,858

Related U.S. Application Data

[63] Continuation of Ser. No. 418,407, Nov. 23, 1973.

[52] U.S. Cl. .......................................... 340/172.5
[51] Int. Cl.$^2$ ............................................. G06F 9/18
[58] Field of Search .................... 340/172.5; 445/1

[56] References Cited

UNITED STATES PATENTS

| | | | |
|---|---|---|---|
| 3,311,889 | 3/1967 | Birmingham et al. | 340/172.5 |
| 3,333,250 | 7/1967 | Hill et al. | 340/172.5 |
| 3,573,856 | 4/1971 | Best et al. | 340/172.5 |
| 3,602,889 | 8/1971 | Gayman et al. | 340/172.5 |
| 3,771,135 | 11/1973 | Huettner et al. | 340/172.5 |

Primary Examiner—Mark E. Nusbaum

[57] ABSTRACT

A bus allocation system for a plurality of digital processing devices which are to be given access to a common data bus in a predetermined sequence. The devices include synchronized counters incremented once each time a data communication is made on the bus from any device. The counters operate through a repeating cycle of counts, and each device is enabled to communicate data during a predetermined one or more of the counts in each cycle.

4 Claims, 2 Drawing Figures

BUS ALLOCATION CONTROL APPARATUS

This is a continuation of application Ser. No. 418,407, filed Nov. 23, 1973.

The invention herein described was made in the course of or under a contract, or subcontract thereunder, with the Department of the Air Force.

BACKGROUND OF THE INVENTION

This invention relates generally to digital processing systems. Such systems customarily include numerous components, hereinafter referred to as "devices," which may contain data to be communicated to other devices in carrying out a digital processing program. Examples of the components referred to are tape readers and other input arrangements, registers, and memories of various types.

FIELD OF THE INVENTION

The data to be communicated in such a system may include a code identifying the devices to which the data is to be communicated, in which case all the devices may be connected to a single data bus: when the bus communicates a particular code, a particular device is actuated to accept the data which follows, and the remaining devices do not accept it. Such an arrangement is economical of intercommunication wiring, but imposes the condition that only one device may be allowed to communicate data to the bus at any one time. The procedure for ensuring that this condition is met is called bus allocation, and the present invention relates particularly to the field of bus allocation.

It is customary in designing bus allocation systems to base the design on some demand principle. When a particular device completes its use of the bus, some centralized or distributed apparatus, having received signals indicating that various other devices all have data to be communicated to the bus, proceeds according to some demand principle to assign the bus to a particular one of the devices. A typical instance is one in which the various devices are assigned priorities, and the use of the bus is given to them in the order of priority. This is an intricate arrangement, and must be made even more intricate if it is desired to assure that the device with the highest priority may not monopolize the bus to prevent lower priority devices from ever using it.

Arrangements of this sort are expensive, difficult to design in a fool-proof manner, and difficult to simulate and verify. All these factors contribute materially to an ultimate high cost and reduced reliability.

My invention is based on the discovery that in many digital processing systems data is available which at least in part can take bus allocation out of the field of probabilistics. Some digital processing systems indeed are completely determinate in the bus allocation requirements, when they are analyzed from this point of view. To the extent that this can be accomplished, a faster, simpler, less expensive, and more reliable system results.

SUMMARY OF THE INVENTION

When it appears that the relative activity of the several devices making up a digital processing system can be predicted with some degree of accuracy, the assignment of a data bus to the various devices according to a predetermined schedule is practical and economical. The present invention makes such an assignment of a bus to the several devices on a count basis. The devices include synchronized counters which operate through a short, repeating cycle of counts, being incremented each time data is communicated on the bus from any device. Each device is assigned one or more count numbers, and when the count reaches each number the device to which the number is assigned is placed in communication with the bus. Thus a first device may be enabled once during each counter cycle, while a second device may be enabled three times during the cycle, and a third device may be enabled twice, all according to the expected density and distribution of use of the devices in the system as assigned.

It is a principal object of the invention to provide an improved digital processing system in which bus allocation is accomplished in a new and improved fashion. Another object of the invention is to provide a digital processor bus allocation system in which several devices are assigned specific counts of a repeating count cycle, and synchronized counters in the devices count the data transmissions and enable the several devices during the counts assigned thereto.

Various other objects, advantages, and features of novelty which characterize my invention are pointed out with particularity in the claims annexed hereto and forming a part hereof. However, for a better understanding of the invention, its advantages, and objects attained by its use, reference should be had to the drawings which form a further part hereof, and to the accompanying descriptive matter, in which there is illustrated and described a preferred embodiment of the invention.

DESCRIPTION OF THE PREFERRED EMBODIMENT

Figure 1:
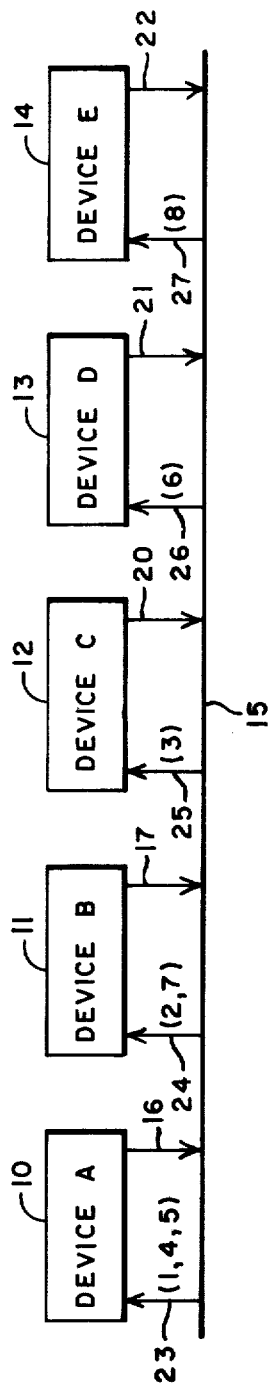
FIG. 1 is a block diagram of a complete system according to my invention.

Referring now to FIG. 1, a digital processing system is shown to comprise a plurality of devices 10, 11, 12, 13, and 14 which are to communicate data on a common bus 15. It is, of course, understood that the various devices may receive data, addressed to them, from bus 15 as is usual in systems of this sort, but components having only this function are omitted to avoid unduly complicating the disclosure.

Device 10 may communicate data to bus 15 through a connection 16, device 11 through connection 17, device 12 through connection 20, device 13 through connection 21, and device 14 through connection 22. The devices are further connected to the bus through connections 23, 24 25, 26, and 27 respectively, to determine the bus allocation, as will be more clearly apparent from FIG. 2, to which reference should now be made.

Figure 2:
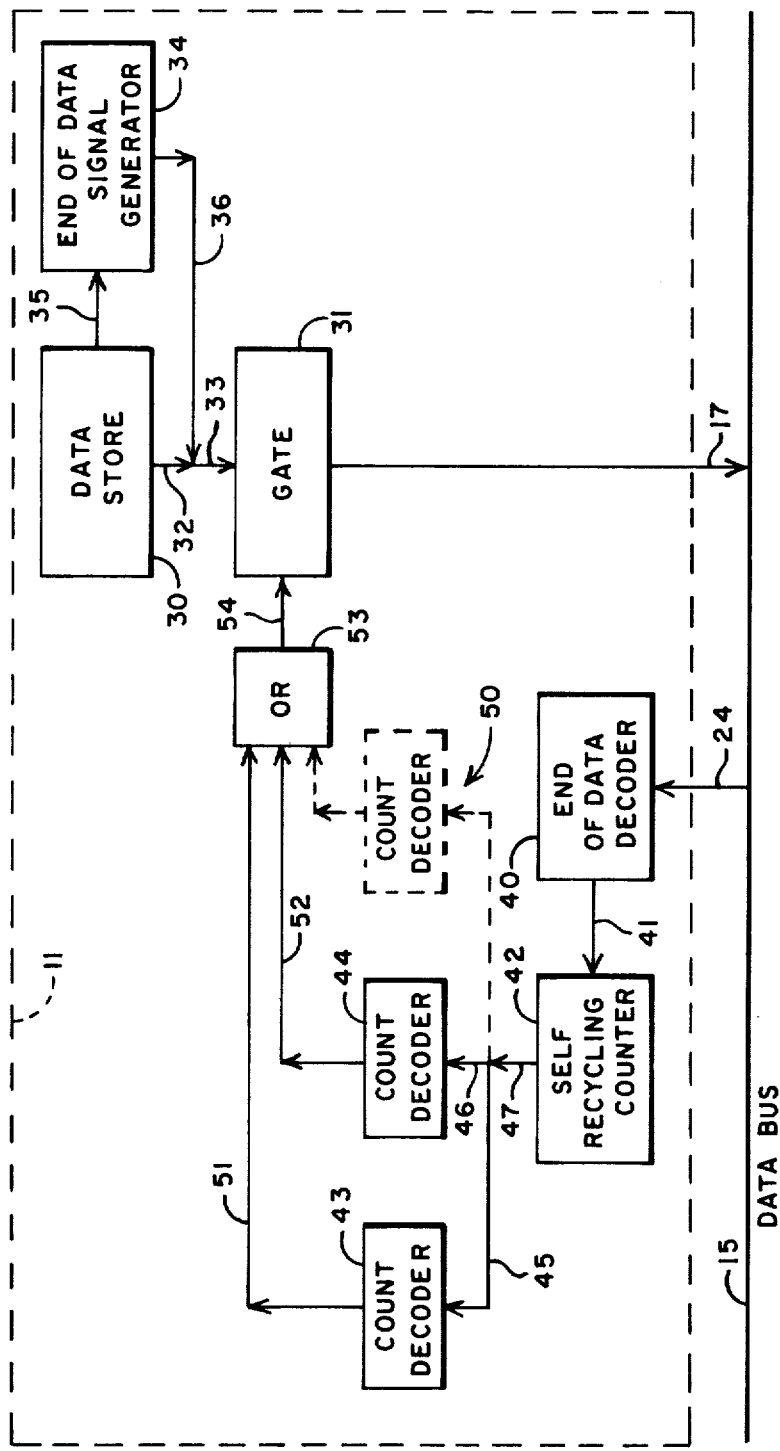
FIG. 2 is a diagram showing the structure associated with a typical device of FIG. 1.

FIG. 2 shows device 11 in more detail. The data for communication by the device accumulates in a data store 30, and when a gate 31 is energized the data is transmitted through conductors 32 and 33, gate 31, and connection 17 to bus 15. An END OF DATA signal generator 34 is connected to data store 30 at 35, and acts as is well known in the art to supply a signal at 36 when there is no data in store 30, whether this is because no data is in fact present, or because data present has now been communicated.

A variety of components for implementing the data store-gate-signal generator arrangement are commercially available, and suitable interconnection arrangements are well known. The data store may, for example, comprise a Fairchild 3341 integrated circuit memory which provides a unique signal on a special terminal when the memory is emptied. The concept of and a variety of formats for interspersing special coded instructions among data being transmitted are described in detail in chapter 5 of Murphy and Kallis, *Introduction to Data Communication* (1968). Specific instruction codes are discussed in chapter 6 of the same book.

Gate 31 may comprise any of a number of well known simple gate configurations. Several suitable gates are described in detail in chapter 1 of Morris and Miller, *Designing with TTL Integrated Circuits* (1971).

Signal generator 34 may be a simple decoder comprising a plurality of gates connected to provide a specific coded digital signal upon receipt of the signal provided at the special terminal of the data store. A variety of such decoders are described in chapter 8 of the Morris and Miller book. The principal requirement is that the output code be chosen so as not to correspond to any anticipated data signal. The data and END OF DATA signals may be introduced onto conductor 32 in a well known manner through the use of gates such as Texas Instruments 7401 open collector NAND gates, which may be the same gates employed to implement signal generator 34.

Also included in device 11, and connected to bus 15 by connection 24, is an END OF DATA decoder 40. Each time an END OF DATA signal appears on bus 15, from any device, decoder 40 supplies a signal at 41 to a self-recycling counter 42, incrementing the counter by one count. Decoder 40 may be implemented in a manner very similar to signal generator 34. The principal requirement is that it be arranged to detect the code produced by the signal generator. As previously indicated, a variety of suitable decoders are described in chapter 8 of the Morris and Miller book. Counter 42 may be any one of several common counter configurations. Suitable counters are described in Morris and Miller, chapter 10.

Device 11 includes decoding means which may include a pair of count decoders 43 and 44 energized at 45 and 46 from the output 47 of counter 42. Decoders suitable for count decoder 43 are found in Morris and Miller, chapter 8. As suggested at 50 the number of decoders may be increased or decreased, according to the number of counts per count cycle during which it is intended that device 11 shall be enabled to communicate with bus 15.

The decoders give outputs 51 and 52 to an OR gate 53, which energizes gate 31 through a connection 54 whenever there is a signal from any decoder.

One predetermined count sequence is shown by the parenthetical numerals in FIG. 1. For illustrative purposes, a count cycle of eight counts has been selected. When the count is one, a decoder in device 10 operates its gate, and the device is placed in communication with the bus. When the END OF DATA signal reaches the bus, the counters in each device are incremented by one. Count two in the cycle is assigned to device 11, which now communicates its data, or a bare END OF DATA signal, to the bus. The counters are again incremented, and so on. Counts 1, 4, and 5 are assigned to device 10, counts 2 and 7 to device 11, and counts 3, 6 and 8 to devices 12, 13, and 14 respectively. It is evident that in the contemplated program device 10 is expected to be the busiest. Note that this bus allocation has no relation to elapsed time: when a device "acquires" the bus it continues to use it until its message is ended, whether short or long.

Numerous objects and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim as my invention:

1. In a digital processing system:
   a data bus;
   a plurality of devices containing data to be communicated on said data bus, the data communicated by each device including at least an END OF DATA signal;
   self-recycling counter means in each device adapted for incrementation through a repeating cycle of counts in response to successive END OF DATA signals;
   means in each device connecting said counter means to said bus so that the counter means in all of said devices are synchronously incremented by each END OF DATA signal;
   output means in each device selectively operable to permit transmission of data in said device to said data bus; and
   further means in each device for causing operation of said output means only when the count of END OF DATA signals has one or more predetermined values in the cycle of counts.

2. Apparatus according to claim 1, including means for producing in each device an END OF DATA signal to which any other data to be communicated are prefixed.

3. In a digital processing system:
   a data bus;
   a plurality of devices containing data to be communicated on said said data bus, said data including in each case at least an END OF DATA signal;
   self-recycling counter means in each device arranged to be incremented through a repeating cycle of counts;
   means in each device connecting said counter means to said bus for synchronous incrementation of said counter means by said END OF DATA signals;
   output means in each device operable to connect the device to the data bus for communicating thereto the data contained in the device;
   and further means in each device for causing operation of said output means when the count of said signals has a predetermined value in said cycle.

4. In a data bus allocation system in which a common data bus is sequentially connected through selectively operable gates to individual devices of plurality of devices for supplying data to be communicated on the bus, and in which the gates are controlled by a counter arrangement which assures each device access to the bus in a regular sequence, the improvement which comprises:

END OF DATA signal generation means for appending a signal distinguishable from the data to be communicated on the bus to the data supplied by each device;

a signal decoder in each device, connected to the bus and operable to produce an output in response to an END OF DATA signal on the bus;

recycling counter means in each device, connected to receive the outputs of said signal decoder therein and adapted for incrementation through a repeating cycle of counts in response to successive outputs; and count decoder means in each device, connected to receive the count in said counter means therein and operable to permit data transmission through a gate associated with the device only in response to one or more unique count values in the cycle of counts.

* * * * *